March 23, 1971  HANS-DIETER KELLER ET AL  3,572,418

METHOD FOR ASSEMBLING MOLDING FLASKS WITH SAND CORES

Filed May 3, 1968  6 Sheets-Sheet 1

Inventors:
Hans-Dieter Keller
Horst Henkel
By Michael S. Striker
Attorney

United States Patent Office 3,572,418
Patented Mar. 23, 1971

3,572,418
METHOD FOR ASSEMBLING MOLDING FLASKS WITH SAND CORES
Hans-Dieter Keller, Todenhausen, and Horst Henkel, Friedensdorf, Biedenkopf, Germany, assignors to Fritz Winter Eisengiesserei oHG, Allendorf, Germany
Filed May 3, 1968, Ser. No. 726,490
Claims priority, application Germany, May 5, 1967, W 43,924
Int. Cl. B22c 9/10, 17/08
U.S. Cl. 164—28
9 Claims

ABSTRACT OF THE DISCLOSURE

Green sand cores are formed in lower parts of core boxes and are thereupon pivoted through 90 degrees about horizontal axes to setting positions. The upper halves of the lower core box parts are thereupon removed and the drag of a molding flask is placed over the cores. The cores are inverted with the drag so that their prints rest in the drag and a cope is placed on top of the drag.

BACKGROUND OF THE INVENTION

The present invention relates to a method of assembling molding flasks with green sand cores. More particularly, the invention relates to a method of producing green sand cores and of introducing such cores into a molding flask.

As utilized in this description, the term "green sand core" is intended to denote a foundry core which is formed of natural sand or of sand whose main constituents are quartz, bentonite, carbon and water and which is not subjected to after-treatment in order to increase its strength. In other words, the core is used for casting the condition in which it is produced, namely, without drying. Preferably, the composition of green sand used for the core is the same as that of molding sand which is used for the casing molds.

It is known that the strength of green sand cores is rather low, i.e., that a green sand core disintegrates after a relatively short period of storage owing to reduction of its moisture content. Due to its low strength, a green sand core can be transported only if special precautions are taken (for example, if transport core irons are inserted). In cases where the use of transport core irons is not possible (for example, owing to the construction of the casting), the introduction of one or more green sand cores into the cope or drag of a molding flask without damaging the core or cores in so doing presents considerable problems. Therefore, the manufacturers sometimes resort to special types of cores which can stand extended storage. Thus, it is already known to add to green sand substances which harden in response to heating. The methods of producing such cores are known as the synthetic resin sand process, box process and oil core process. It is also known to add gas ($CO_2$ solidification sand process) so as to obtain a transportable core. However, cores produced in this way are quite expensive owing to the high cost of manufacture and of the materials employeds.

Green sand cores are presently produced in a core box which defines a cavity having an outline corresponding to the desired configuration of the core. Green sand is rammed into the core box, mainly by hand by resorting to a so-called rammer, or by means of a pneumatic ramming device. It was also proposed to produce green sand cores by mechanical filling-in and compacting, e.g., by blowing or shooting. However, such proposals are not entirely satisfactory because green sand is not suitable for blowing and shooting with conventional apparatus owing to its relatively high moisture content.

German Pat. No. 111,889 proposes to produce casting cores from wet molding sand (green sand) in two stages in each of which one core half is formed separately in a core box half. The sand is filled into and is rammed in a core box half which is rotatable about a horizontal axis. A plate is thereupon laid onto and is clamped to the thus filled core box half. The latter is then rotated with the plate. In the next step, a table is run below the plate, the connection between the plate and the filled core box half is terminated, and the plate together with the half core resting thereon is lowered with the table. The cope or the drag of the molding flask is then placed over and connected to the plate so as to surround the half core. The plate is then inverted so that the half core rests with its core prints in the cope or drag and the plate is thereupon removed. The production of the second half core is carried in the same way. A drawback of this proposal is that, since the core is composed of two halves, there are formed in the interior of the casting inaccessible burrs or like unevennesses which are difficult to remove and whose removal involves considerable expenditures in time and equipment. Additional problems arise in connection with bringing the halves together in order to form a complete core. The patent does not disclose any satisfactory procedure of assembling the half cores.

German Pat. No. 1,164,030 discloses a method of producing a green sand core as a complete (undivided) body so that inaccessible burrs or the like do not occur on the finished casting. The lower core part is produced in a lower core box part by shooting sand into the lower core box part. In the next step, an overvolume or excess of sand is shot on top of the half core in the lower core box half. The upper core box part is placed on top of the overvolume and is pressed against the lower core box part to convert the overvolume into an upper half core which is integral with the half core in the lower core box part. The finished core is withdrawn from the lower core box part by means of an extractor. A transporting grid is installed in the core during production to facilitate insertion of the core into the drag of a molding flask.

The present invention deals with a method which constitutes an improvement over and a further development of the method disclosed in this last mentioned German patent.

SUMMARY OF THE INVENTION

It is an object of our invention to provide a novel and improved method of producing green sand cores as complete undivided bodies and of introducing such cores into a molding flask without resorting to extractors or like auxiliary equipment.

Another object of the invention is to produce green sand cores which can be rapidly and conveniently removed from core boxes without any damage thereto and which can be readily transferred into or installed in a portion of a molding flask without necessitating the insertion of transport core grids into the cores.

One feature of our invention resides in the provision of a method of assembling at least two cores of different composition in a molding flask. This method comprises the steps of introducing green sand into the lower part of a core box and compacting the sand therein, preferably by tamping or ramming, to form a complete one-piece green sand core, changing the position of the resulting core from an initial position which is best suited for filling and compacting to a setting position, preferably by turning the lower core box about a horizontal pivot axis, moving a prefabricated self-supporting second core of synthetic resin sand or the like to a predetermined position with reference to the green sand core so that the mutual positions of the cores correspond to those desired in the molding flask, and transferring the cores into a flask while leaving their mutual positions unchanged.

The transfer of cores into the flask is preferably carried out in several stages which may include separating the upper half of the lower core box part from the lower half to expose the top portion of the green sand core, placing the drag of a flask on top of the lower half of the lower core box part and on top of the receptacle which accommodates the second core, inverting the drag with the cores so that the prints of the cores come to rest in the drag, and placing a cope on top of the drag. The flask is then ready for the casting operation which is carried out in the customary way.

Another feature of our invention resides in the provision of a method of producing sand cores in a core box and of transferring the thus produced cores into a separable portion of a molding flask. This method comprises the steps of maintaining the lower part of a core box in a predetermined initial position in which the cavity defined by the lower part is accessible from above, introducing an oversupply of sand (preferably green sand) into the cavity and ramming and shaping the thus introduced sand to impart thereto the contour of at least one complete sand core, pivoting the lower part of the core box and the finished core therein about a horizontal axis to a setting position (preferably through an angle of about 90 degrees) in which a portion of the lower part overlies a portion of the finished core, removing the overlying portion of the lower part from the remainder of the lower part so that the core is exposed from above, applying a first portion of a molding flask over the core and the remainder of the lower part and detachably securing the first portion to such remainder of the lower part, inverting the first portion with the core and the remainder of the lower part so that the core comes to rest in the first portion, detaching the first portion from the remainder of the lower part, and applying a second portion of the flask over the first portion.

The shaping step may comprise applying over the lower part an upper part of the core box while the lower part dwells in its initial position so that the upper part determines the final contour of that portion of the core which comes in contact therewith. The inverting step preferably comprises pivoting the first part of the flask through 180 degrees, and the thus inverted first part is thereupon preferably lowered prior to application of the second portion of the flask.

The core which is produced in the lower part of the core box may consist of several green sand cores which are integrally connected to each other by one or more core prints.

The novel features which are considered as characteristic of the invention are set forth in particular in the appended claims. The improved method itself, however, together with additional features and advantages thereof, will be best understood upon perusal of the following detailed description of certain specific embodiments of an apparatus for the practice of the method with reference to the accompanying drawing.

DESCRIPTION OF THE PREFERRED EMBODIMENTS

Figure 7:
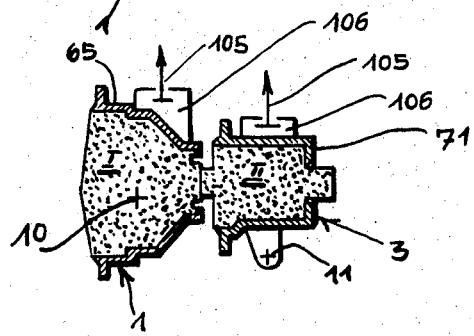
FIG. 7 illustrates the manner in which portions of the lower core box parts can be removed in order to expose the cores.
Figure 8:
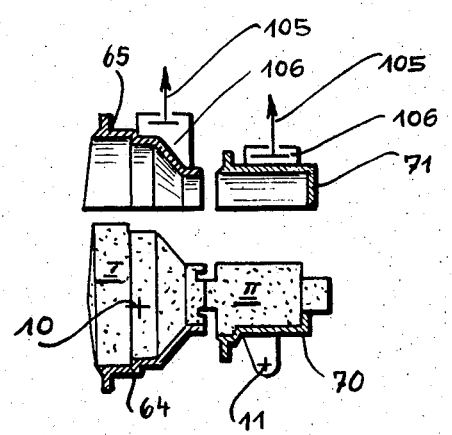
FIG. 8 shows the struuucture of FIG. 7 with portions of the lower core box parts removed.
Figure 9:
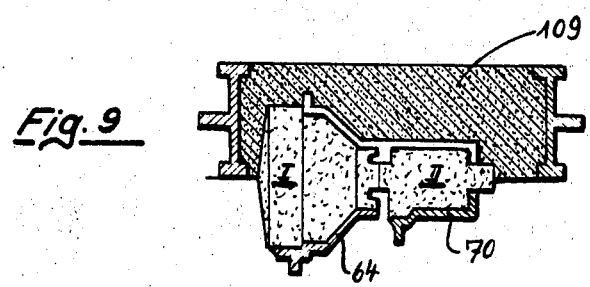
FIG. 9 illustrates the manner in which the drag of a molding flask is applied over the cores in the lower core box parts.
Figure 9A:
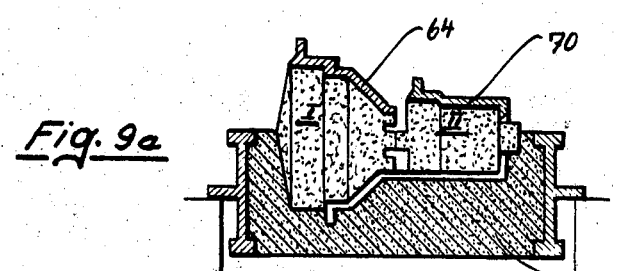
FIG. 9a illustrates the structure of FIG. 9 with the drag and cores in inverted positions.
Figure 9B:
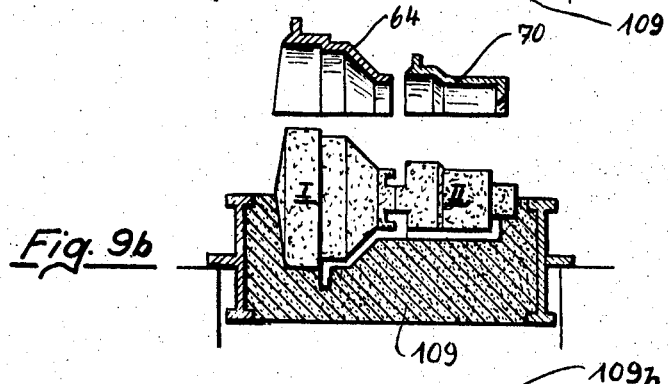
FIG. 9b illustrates the structure of FIG. 9a with the remaining portions of the lower core box parts separated from the cores which rest in the drag.
Figure 9C:
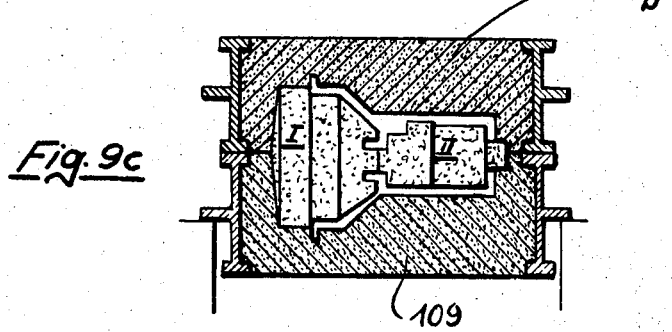
FIG. 9c illustrates a fully assembled molding flask with the cope applied over the drag.
Figure 10:
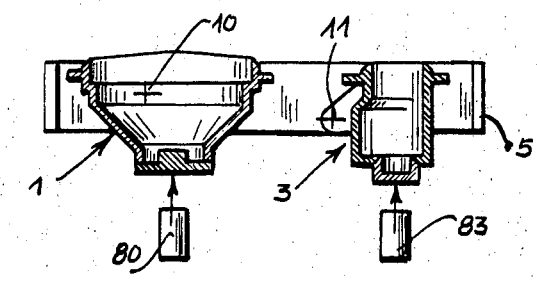
FIG. 10 illustrates a portion of an apparatus wherein one of the lower core box parts is turnable and reciprocable with reference to its frame.
Figure 11:
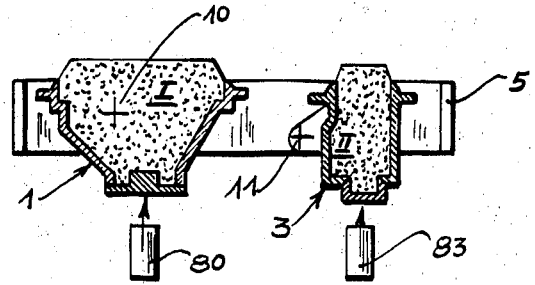
FIG. 11 illustrates the structure of FIG. 10 and two partly finished cores in the lower core box parts.
Figure 12:
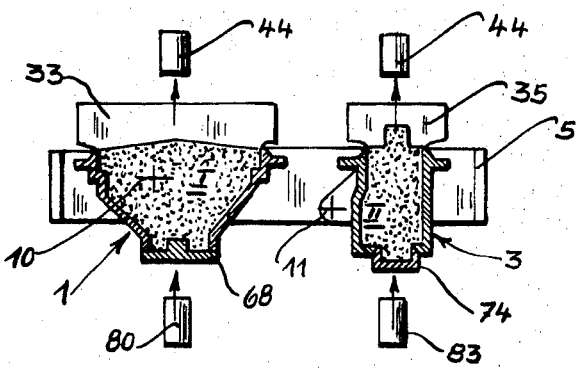
FIG. 12 illustrates the step of applying the upper core box parts over the lower core box parts of FIG. 11.
Figure 13:
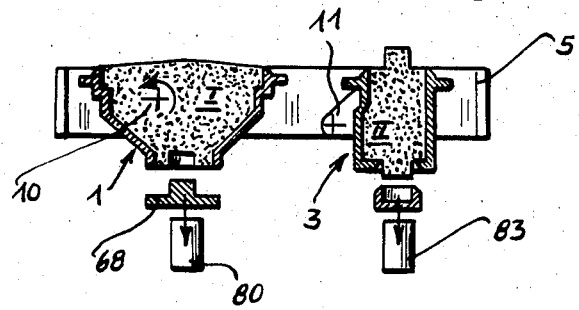
FIG. 13 illustrates the structure of FIG. 11 with two finished green cores in the lower core box parts.
Figure 14:
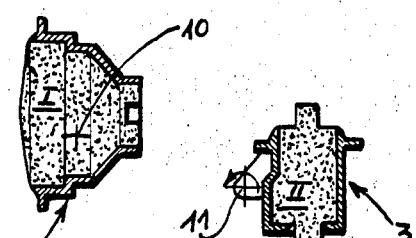
FIG. 14 illustrates the structure of FIG. 13 with one of the lower core box parts in setting position.

FIGS. 1 to 9c illustrate various stages in the production of a composite green sand core. FIG. 9c further shows a cope 109b in operative position on top of a drag 109. These illustrations merely show those parts of the apparatus which are necessary for full understanding of the following description of the operation. Also, for the sake of simplicity, FIG. 1–9c merely show two lower core box parts, namely, the parts 1 and 3, it being understood, however, that the other two lower core box parts can be manipulated in the same way. The numeral 11 denotes the pivot axis of the part 3.

Figure 1:
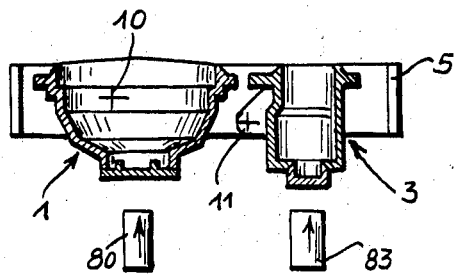
FIG. 1 illustrates a portion of an apparatus which can produce two cores at a time, the lower core box parts of the apparatus being shown in their initial positions.
Figure 2:
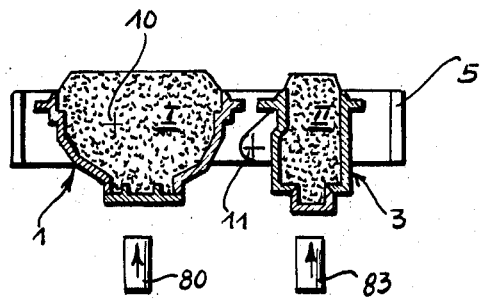
FIG. 2 illustrates the structure of FIG. 1 with the two lower core box parts overfilled with green sand.
Figure 3:
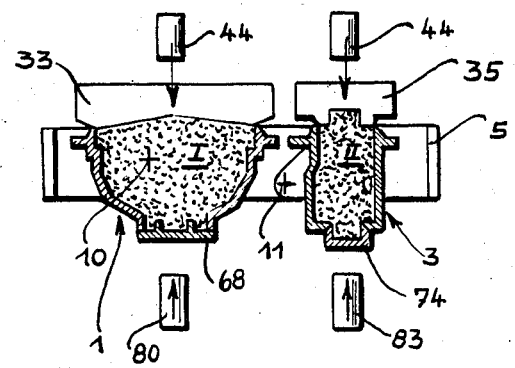
FIG. 3 illustrates the application of upper core box parts over the surplus of green sand in the lower core box parts.

The cores which are formed in the lower core box parts 1 and 3 are respectively designated by the reference characters I and II (FIGS. 2–9c). FIG. 1 shows the lower core box parts 1 and 3 in their initial positions prior to introduction of green sand. In FIG. 2, the lower core box parts 1, 3 are already filled with sand whereby the sand extends beyond the top edges of the parts 1, 3. The upper zones of the material in the lower core box parts 1, 3 are thereupon compacted by the upper core box parts 33, 35 (see the cylinders 44 in FIG. 3). The lower portions of the cores I, II then follow closely the outlines of the adjacent portions of the lower core box parts 1 and 3. A single working cylinder 44 suffices to move the parts 33 and 35.

Figure 4:
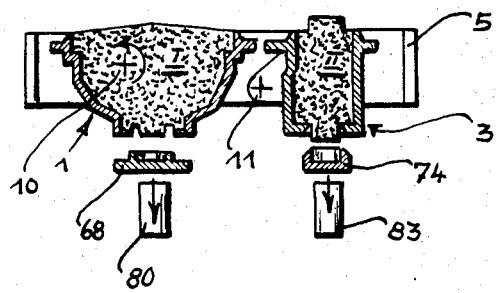
FIG. 4 illustrates the structure of FIG. 1 or 2 upon completion of the cores in the lower core box parts.
Figure 5:
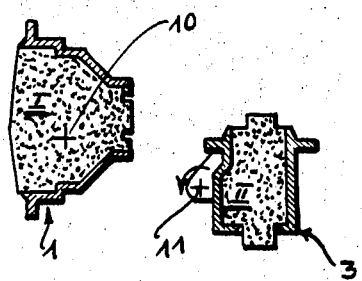
FIG. 5 illustrates some of the structure shown in FIGS. 1–4 with one of the lower core box parts in setting position.
Figure 6:
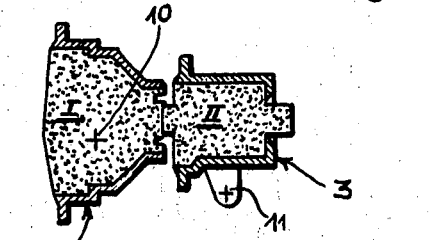
FIG. 6 shows the structure of FIG. 5 with both lower core box parts in setting positions.

FIG. 4 illustrates the lower core box parts 1 and 3 with the respective bottom parts 68, 74 removed by way of working cylinders 80, 83. The upper core box parts 33, 35 (not shown) are lifted above and away from the parts 1 and 3. The direction in which the lower core box part 1 is turnable about the pivot axis 10 to the position shown in FIG. 5 is indicated by an arrow. In FIG. 5, the lower core box part 1 is already turned by 90 degrees about the axis 10 but the lower core box part 3 still remains in its initial position. The part 3 is then turned by 90 degrees in a counterclockwise direction and assumes the position shown in FIG. 6, i.e., the core II abuts against the core I. The positions shown in FIG. 6 are the so-called inserting positions of the cores I and II.

FIG. 7 illustrates that stage during which the tools 105 (indicated by arrows) engage the side parts 65, 71 of the lower core box parts 1, 3 prior to lifting of such side parts to the positions shown in FIG. 8 in which the upper halves of the cores I and II are exposed. The tools 105 engage the projections or sockets 106 of the side parts 65, 71. When the side parts 65, 71 are moved to the positions shown in FIG. 8, the cores I and II rest solely in the side parts 64, 70 of the lower core box parts 1 and 3.

FIG. 9 illustrates the drag 109 in a first position. The side parts 64, 70 are then inverted together with the drag 109 (see FIG. 9a) so that the cores I and II rest on the drag. Such inersion takes place together with the frame 5 (see FIGS. 1–4). FIG. 9b illustrates the drag 109 in lowered position in which the upper halves of the cores I and II are exposed while the side parts 64, 70 temporarily remain in their inverted positions. In the next stage, the cope 109b is placed on top of the drag 109 (FIG. 9c). The casting operation can begin and is carried out in the customary way.

The heretofore described apparatus can be further modified in a number of ways without departing from the spirit of our invention. The exact design of the apparatus depends on the number, configuration and the mode of forming the cores as well as on the nature of the castings to be produced. As described in connection with FIGS. 1–9c it is possible to produce two cores at a time, i.e., such a number of cores as is necessary for a single casting. The molding flask comprises differently dimensioned drags and copes if it is to receive a single core, a pair of cores or four cores at a time.

Furthermore, the lower core box parts need not necessarily turn about horizontal pivot axes. In other words, the core or cores can be produced in setting positions so that the lower core box part or parts can be rigidly affixed to the frame 5 or to an equivalent inverting receptacle. The drag which is employed in such apparatus is simply coupled to the lower core box part or parts and is inverted to receive the core or cores prior to detachment of the lower core box parts from the drag and subsequent descent and evacuation of the loaded drag from the apparatus. The apparatus of FIGS. 1–9c is resorted to when the green core or cores cannot be produced in setting position, i.e., when it is necessary to pivot the lower core box part or parts prior to inversion of the frame 5 preparatory to coupling of the frame with the drag. If a simple pivotal movement of the lower core box or parts does not suffice to move the core or cores therein to a requisite setting position, one or more lower core box parts are pivotably and/or reciprocably mounted in the frame of the apparatus. Also, it might be necessary to pivot one or more lower core box parts through angles which exceed or are smaller than 90 degrees.

Figure 15:
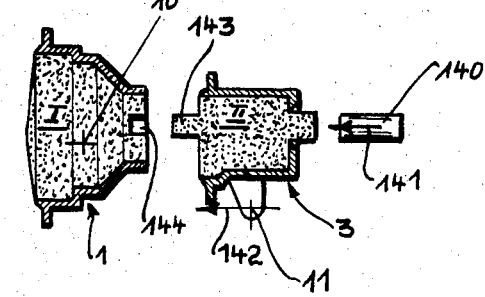
FIG. 15 shows the structure of FIG. 14 with the other core box part in inclined position.
Figure 16:
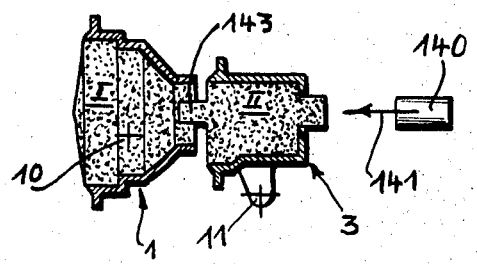
FIG. 16 illustrates the structure of FIG. 15 but shows both lower core box parts in setting positions.
Figure 17:
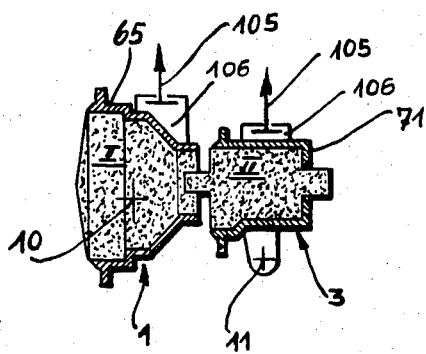
FIG. 17 illustrates the step of removing portions of the lower core box parts to expose the upper portions of green cores therein.

FIGS. 10–17 illustrates a portion of an apparatus wherein one of the lower core box parts is not only pivotable about a horizontal axis but is also reciprocable toward and away from the associated lower core box part along a substantially horizontal path. These figures show certain stages of an operating cycle in an apparatus wherein the lower core box part 3 is pivotable about the horizontal axis 11 and is also reciprocable along a horizontal path toward and away from the lower core box part 1. The stages shown in FIGS. 10 to 14 are identical with those shown in FIGS. 1–5 with the sole exception that the distance between the lower core box parts 1, 3 shown in FIGS. 10–14 exceeds the distance between the same parts in FIGS. 1–5. FIG. 15 shows a drive device 140 (for example, a hydraulically or pneumatically operated cylinder and piston assembly) whose piston rod 141 serves as a means to shift the lower core box part 3 in and counter to the direction indicated by arrow 142 so that a core print 143 of the core II can enter a matching female portion 144 of the core I. The cylinder and piston assembly 140 is actuated after the lower core box part 3 completes a pivotal movement about the axis 11 through an angle of 90 degrees (compare FIGS. 14 and 15). FIG. 16 shows the cores I and II in assembled condition, i.e., the print 143 is received in the female part 144 and the piston rod 141 is returned to retracted position. FIG. 17 illustrates the tools 105 which engage the projections or sockets 106 of the side parts 65, 71 preparatory to lifting of side parts 65, 71 above and away from the remaining portions of the lower core box parts 1 and 3. The transfer of cores I, II into a drag (not shown) and the application of a cope is carried out in the same way as described hereinabove (see FIGS. 9–9c).

It is clear that the drive device 140 can be arranged to reciprocate the lower core box part 1 with reference to the lower core box part 3 or that the apparatus of FIGS. 10–17 may comprise two drive devices 140, one for each of the lower core box parts 1 and 3. The mutual positions of cores I and II in FIG. 17 (i.e., in the setting positions of the respective core box parts 1 and 3) correspond to desired positions of such cores in the flask. The transfer of cores I, II into the drag (while the mutual positions of the cores remain unchanged) is carried out in the same way as described in connection with FIGS. 9–9c.

In its presently preferred form, the apparatus for the practice of our method comprises a composite core box having an upper section which may comprise a single part or several parts (including the parts 33, 35 shown in FIG. 12) and a lower section which may also comprise a single part or two, four or even more parts. In cases where the contour of one or more cores corresponding to the upper core box part or parts is simple in design, a specially designed upper core box part may be dispensed with and the configuration of the upper side or sides of the core or cores in the lower core box part or parts may be imparted by a suitable tamping ram which is employed to condense the material in the lower core box parts.

The design of the lower core box part or parts depends on the desired contour of the corresponding portion or portions of the cores. Thus, in the production of simple cores, it often suffices to employ one-piece lower core box parts whereas, when the design of cores is more complicated, each lower core box part preferably consists of two, three, four or more portions or pieces. For example, it is possible to dispense with one or more separable bottom parts or to dispense with separable side parts of one or more lower core box parts. The side parts of the lower core box parts may be provided with matching projections which complement each other when the portions of the lower core box parts are assembled to provide one or more cavities for the cores. For example, a rather simple lower core box part may comprise two side parts and one or two bottom parts. Furthermore, and if the core or cores are of simple contour, they may be formed in setting positions so that the corresponding lower core box part or parts need not be pivoted or reciprocated prior to application of the drag. Also, and as mentioned above, the upper core box part or parts can be omitted if the corresponding portions of the cores are of simple design so that they can be shaped by a ram or by another suitable tamping tool. In its rudimentary form, the core box may consist of a single piece which defines a rather simple cavity for a core. This is possible when the core is without undercuts and when the configuration of the core is such that it can be readily removed from the core box without separation of two or more portions of the core box.

FIGS. 18, 19, 20 and 21 illustrate certain stages in the operation of a further apparatus. This apparatus is employed for the production of at least one core I which consists of green sand and for assembly of the core I with at least one self-supporting prefabricated core III (FIG. 19a) which consists of synthetic resin sand or another material which is not green sand or which contains green sand and one or more additional ingredients. The core I is formed in a lower core box part 1. The self-supporting core III is prefabricated, i.e., it is produced and properly treated in another apparatus so that it is capable of being transported independently of a drag. The frame 5 (FIGS. 18, 19) accommodates the lower core box part 1 in such a way that the latter is pivotable about the axis 10 between an initial position (FIGS. 18–19) and a setting position (FIGS. 20–21), and a simple receptacle 145 for one or more cores III, i.e., for one or more prefabricated cores which are not produced in this receptacle. It is clear that the frame 5 can accommodate two or more lower core box parts for cores which consist of green sand or of a mixture of green sand with fillers of hardencores III which consist of a material other than green sand or of a mixture of green sand with fillers of hardenable material.

Figure 18:
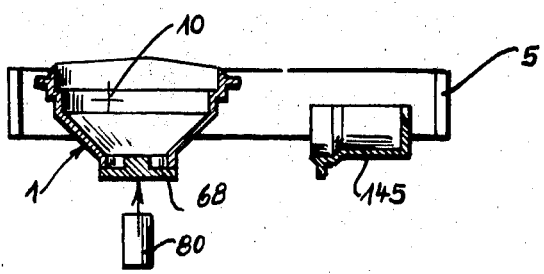
FIG. 18 illustrates a portion of a further apparatus wherein a green sand core is to be assembled with a prefabricated self-supporting core to form therewith a composite core prior to transfer into a molding flask.
Figure 19:
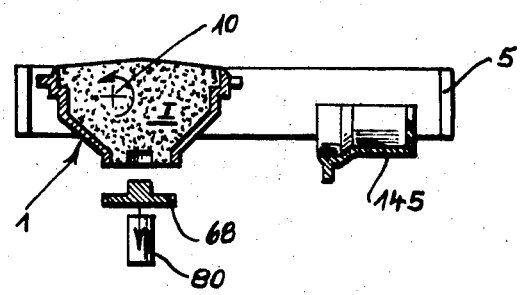
FIG. 19 illustrates the structure of FIG. 18 and a freshly formed green sand core in the corresponding lower core box part.
Figure 20:
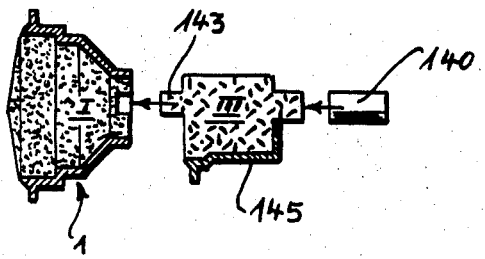
FIG. 20 illustrates the structure of FIG. 19 and the prefabricated core in a receptacle which is adjacent to the green sand core.
Figure 21:
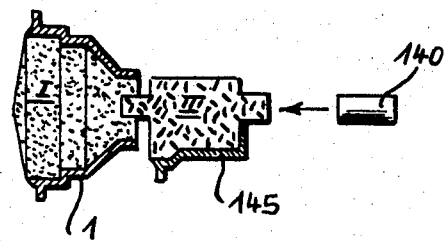
FIG. 21 illustrates the structure of FIG. 20 and shows the prefabricated core in abutment with the green sand core.
Figure 19A:
FIG. 19a illustrates a prefabricated core.

The receptacle 145 of FIG. 18 replaces the lower core box part 3 of FIGS. 10 to 17. FIG. 19 shows the lower core box part 1 with a properly compacted and profiled complete green and sand core I therein while the receptacle 145 is still empty. The bottom part 68 has been lowered by the cylinder 80 so that the remainder of the lower core box part 1 is ready for pivoting. FIG. 20 illustrates the core I and a portion of the lower core box part 1 after pivoting through 90 degrees about the axis 10. This is the setting position of the pivotable portion of the lower part 1. The receptacle 145 accommodates the core III of FIG. 19a and the cylinder and piston assembly 140 is about to perform a working stroke in order to movie the print 143 of the core III into the matching female portion of the core I (FIG. 21). The resulting composite core is then manipulated in the same way as described in connection with FIGS. 7–9c.

The method of the present invention is intended primarily for use in the production of green sand cores, particularly of cores having a size and/or shape which was heretofore produced by employing expensive sands, i.e., materials other than green sand, which render it possible to produce a self-supporting core capable of withstanding shipment independently of a drag or by resorting to special transporting irons. The apparatus of FIGS. 18 to 21 is employed when a core consisting entirely of green sand is not satisfactory, either because of its brittleness, unsatisfactory surface finish or the need for a thin-walled self-supporting core. The core III can be assembled with the core I prior, during or subsequent to introduction into a drag. FIGS. 18–21 show that embodiment wherein the cores I and III are assembled or stacked prior to introduction into the drag, i.e. wherein the mutual positions of cores I and III in the setting position of the side parts of the lower core box part 1 and in the position of the receptacle 145 as shown in FIG. 21 correspond to the desired positions of such cores in the flask.

In all embodiments of our method, the lower core box part or parts preferably accommodate the major portions of the respective green sand cores. Furthermore, instead of utilizing upper core box parts which are separable from the respective lower core box parts, the upper core box parts can be hinged or otherwise articulately connected to the lower core box parts so that they can be applied against the respective lower core box parts in order to impart the final contour to cores in the lower box parts and that they can move to open or idle positions in which they allow unimpeded introduction and ramming of sand in the lower core box parts.

The cores produced in the lower core box parts may be integrally connected to each other by two or more core prints to guarantee stable position of cores in the drag.

In case of using and handling at least one self-supporting hardened second core formed from synthetic hardenable core material such core or cores respectively need not necessarily be prefabricated as is core III but a synthetic hardenable core material other than green sand may be introduced into at least one lower part of the core box (which may comprise a usual cavity and need not be a special receptacle), formed into a self-supporting hardened core therein by usual means as e.g. compacting and/or transferring heat thereto while being supported in that lower part of the core box, and such synthetic hardened core or cores respectively may thereafter be moved to a predetermined position with reference to the green core or cores so that the mutual positions of the green and other cores correspond to those desired in the flask.

Without further analysis, the foregoing will so fully reveal the gist of the present invention that others can, by applying current knowledge, readily adapt it for various applications without omitting features which fairly consititue essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A method of assembling at least two cores of different composition in a molding flask, comprising a first step of introducing green sand into at least one lower part of a core box and compacting the sand therein to form at least one complete core; a second step of changing the position of the resulting core or cores respectively; a third step of introducing a synthetic hardenable core material other than green sand into at least one other lower part of the said core box and forming at least one self-supporting hardened second core or cores respectively therein; a fourth step of moving said second core or cores respectively to a predetermined position with reference to the green core or cores respectively so that the mutual positions of said green and other cores correspond to those desired in the flask; and a fifth step of transferring the cores into a flask while leaving their mutual positions unchanged.

2. A method of assembling at least two cores of different composition in a molding flask, comprising a first step of introducing green sand into the lower part of a core box and compacting the sand therein to form a complete green core; a second step of changing the position of the resulting core; a third step of moving a prefabricated self-supporting second core to a predetermined position with reference to the green core so that the mutual position of said cores correspond to those desired in the flask; and a fourth step of transferring the cores into a flask while leaving their mutual positions unchanged.

3. A method as defined in claim 2, wherein said second core or cores respectively consist of synthetic resin sand.

4. A method of producing sand cores in a core box and of transferring the cores into a separable portion of a molding flask, comprising the steps of maintaining the lower part of a core box in a predetermined initial position in which the cavity defined by such lower part is accessible from above; introducing a supply of sand into the cavity and ramming and shaping the thus introduced material to impart thereto the shape of at least one complete sand core; pivoting the lower part and the core therein about a horizontal axis to a setting position in which a portion of the lower part overlies a portion of the core; removing the overlying portion of the lower part from the remainder of the lower part; applying a first portion of a molding flask over the core and the remainder of the lower part and securing such first portion to said remainder; inverting the first portion with the core therein so that the core comes to rest in the first portion; detaching the first portion from the remainder of the lower part; and applying a second portion of the flask over the first portion.

5. A method as defined in claim 4, wherein said shaping step comprises applying an upper part of the core box over the lower part so that the upper part determines the final contour of that portion of the core which comes in contact with the upper part.

6. A method as defined in claim 4, wherein said inverting step comprises pivoting the first portion of the flask together with the core and said remainder of the lower part about a second pivot axis which is normal to said first mentioned axis.

7. A method as defined in claim 4, further comprising the step of lowering the core and the first portion of the flask prior to application of said second portion over the first portion.

8. A method as defined in claim 4, wherein said core consists of several one-piece cores connected to each other by at least one core print.

9. A method as defined in claim 4, further comprising the steps of moving at least one second core into a predetermined position adjacent to said first mentioned core prior to inversion of said first portion and wherein said inverting step comprises inverting all of said cores while leaving their mutual positions unchanged so that all of said cores come to rest in said first portion of the flask.

References Cited
UNITED STATES PATENTS

| | | | |
|---|---|---|---|
| 386,606 | 7/1888 | Regester | 164—228 |
| 1,561,500 | 11/1925 | Wood | 164—29 |
| 1,924,081 | 8/1933 | Luton | 164—18 |
| 2,012,478 | 8/1935 | Oyster et al. | |
| 2,768,414 | 10/1956 | Dolza | 164—31 |
| 3,192,580 | 7/1965 | Lubalin | 164—18X |
| 3,406,738 | 10/1968 | Hunter | 164—183X |

J. SPENCER OVERHOLSER, Primary Examiner

J. E. ROETHEL, Assistant Examiner

U.S. Cl. X.R.

164—32, 43, 183, 228, 409